(12) United States Patent
Schreter

(10) Patent No.: US 10,817,196 B2
(45) Date of Patent: Oct. 27, 2020

(54) PAGE LIST BASED CRASH RECOVERY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 153 days.

(21) Appl. No.: 16/029,460

(22) Filed: Jul. 6, 2018

(65) Prior Publication Data

US 2019/0012104 A1    Jan. 10, 2019

Related U.S. Application Data

(60) Provisional application No. 62/530,075, filed on Jul. 7, 2017.

(51) Int. Cl.
*G06F 3/06*     (2006.01)
*G06F 17/30*    (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *G06F 17/30088* (2013.01); *H04L 67/1097* (2013.01); *H04L 67/2809* (2013.01); *H04L 67/2842* (2013.01); *H04L 69/40* (2013.01); *G06F 2201/84* (2013.01);
(Continued)

(58) Field of Classification Search
CPC ........ G06F 3/0631; G06F 12/00; G06F 13/00; G06F 16/27; G06F 16/162; G06F 16/215
USPC ....................................................... 711/154
See application file for complete search history.

(56) References Cited

U.S. PATENT DOCUMENTS 5,878,431 A    3/1999   Potterveld et al.
7,849,223 B2   12/2010   Malkhi et al.
(Continued)

*Primary Examiner* — Tuan V Thai
(74) *Attorney, Agent, or Firm* — Mintz Levin Cohn Ferris Glovsky and Popeo, P.C.

(57) ABSTRACT

A method for generating a data directory can include allocating a first page for storing a first segment of a log recording changes applied to data subsequent to a checkpoint. When the first page reaches maximum capacity, a second page can be allocated for storing a second segment of the log. A third page can be allocated for storing a first page list that includes a first page reference to the second data page. A fourth page serving as a restart page can be updated. The fourth page can store a second page list of data pages storing the data directory. The fourth page can be updated to add, to the second page list, a second page reference to the data page. Crash recovery at the computing node can be performed based on the data directory. Related systems and articles of manufacture are also provided.

20 Claims, 6 Drawing Sheets

(51) Int. Cl.
   *G06F 16/11*      (2019.01)
   *H04L 29/14*      (2006.01)
   *G06F 11/14*      (2006.01)
   *H04L 29/08*      (2006.01)
   *G06F 16/2455*    (2019.01)
   *G06F 12/0802*    (2016.01)
   *G06F 16/16*      (2019.01)
   *G06F 16/182*     (2019.01)
   *G06F 16/176*     (2019.01)
   *G06F 16/13*      (2019.01)
   *G06F 12/1009*    (2016.01)
   *G06F 16/951*     (2019.01)
   *G06F 16/27*      (2019.01)
   *G06F 16/23*      (2019.01)
   *G06F 11/16*      (2006.01)
   *G06F 16/245*     (2019.01)
   *G06F 16/215*     (2019.01)

(52) U.S. Cl.
   CPC .... *G06F 2201/85* (2013.01); *G06F 2212/604* (2013.01); *G06F 2212/652* (2013.01)

(56) References Cited

U.S. PATENT DOCUMENTS

| | | | |
|---|---|---|---|
| 9,087,020 | B1 | 7/2015 | Amacker |
| 10,158,642 | B2 | 12/2018 | Jujjuri |
| 10,298,640 | B1 | 5/2019 | Luke |
| 2006/0271705 | A1 | 11/2006 | Garcia-Luna-Aceves |
| 2009/0150566 | A1 | 6/2009 | Malkhi et al. |
| 2009/0287975 | A1* | 11/2009 | Kim ............... G06F 11/1072 714/746 |
| 2010/0002506 | A1* | 1/2010 | Cho ............... G11C 11/5628 365/185.03 |
| 2010/0027351 | A1* | 2/2010 | Seol ............... G11C 11/5628 365/185.24 |
| 2010/0293140 | A1 | 11/2010 | Nishiyama |
| 2011/0197023 | A1* | 8/2011 | Iwamitsu ........... G06F 3/0689 711/114 |
| 2012/0246190 | A1 | 9/2012 | Surtani |
| 2013/0080348 | A1 | 3/2013 | Pantaliano |
| 2013/0275656 | A1 | 10/2013 | Talagala |
| 2014/0059290 | A1 | 2/2014 | Ross |
| 2014/0279920 | A1 | 9/2014 | Madhavarapu |
| 2014/0289358 | A1 | 9/2014 | Lindamood et al. |
| 2014/0304409 | A1 | 10/2014 | Kamath |
| 2015/0058291 | A1 | 2/2015 | Earl |
| 2015/0089185 | A1 | 3/2015 | Brandyberry |
| 2016/0026672 | A1 | 1/2016 | Zhang |
| 2016/0105471 | A1 | 4/2016 | Nunes et al. |
| 2016/0308968 | A1 | 10/2016 | Friedman |
| 2017/0134276 | A1 | 5/2017 | White |
| 2017/0295061 | A1 | 10/2017 | Wittenschlaeger |
| 2019/0171762 | A1 | 6/2019 | Luke |
| 2019/0205993 | A1 | 7/2019 | Rodriguez |

\* cited by examiner

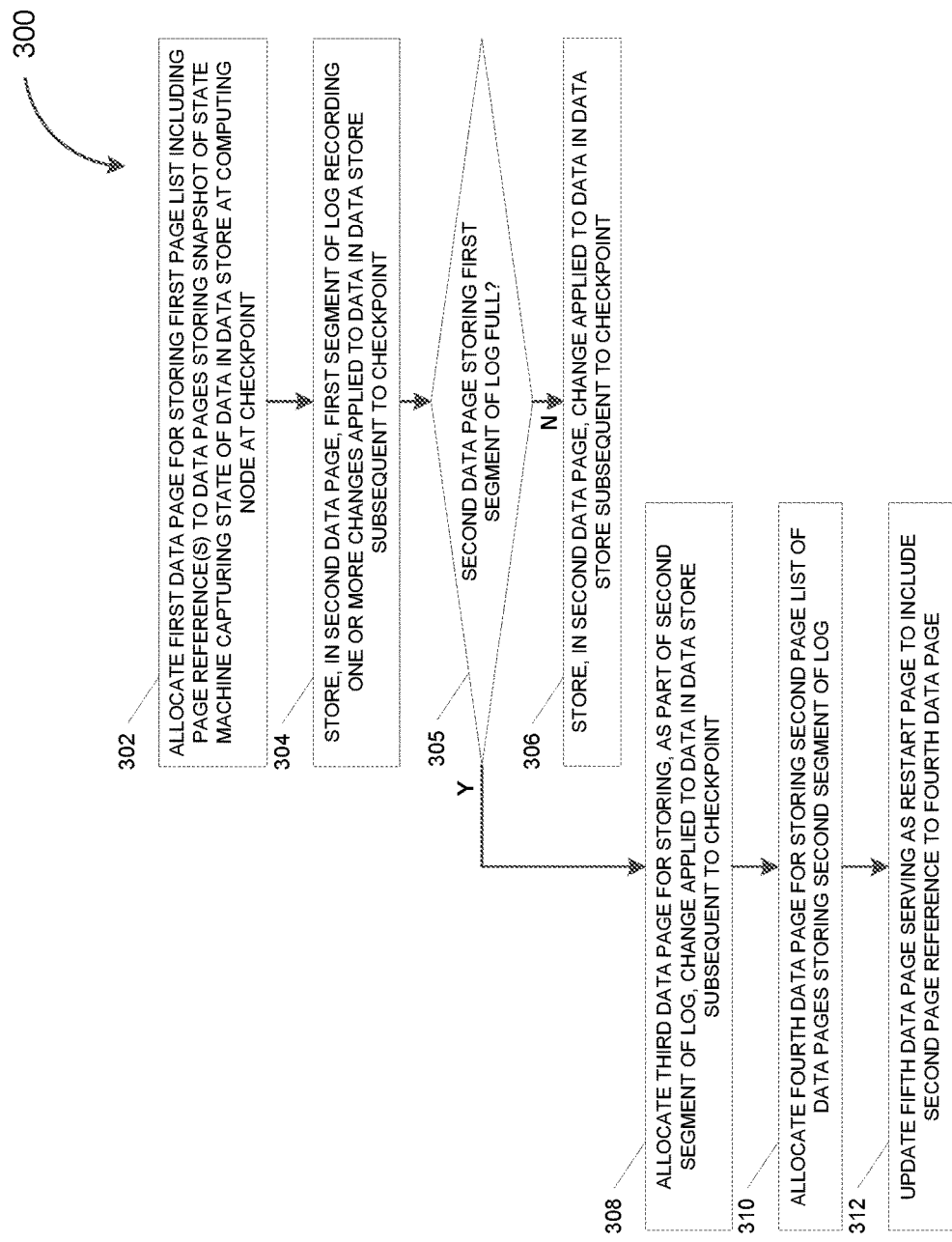

PAGE LIST BASED CRASH RECOVERY

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to restarting a computing node in a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for page list based crash recovery. In one aspect, there is provided a system. The system may include at least one data processor and at least one memory. The at least one memory may store instructions that result in operations when executed by the at least one data processor. The operations may include: generating a data directory for a computing node comprising the distributed data storage system by at least allocating a first data page for storing a first segment of a log, the log recording one or more changes applied to data subsequent to a checkpoint, the data being stored at the computing node comprising the distributed data storage system; in response to the first data page having reached maximum capacity: allocating a second data page for storing a second segment of the log; and allocating a third data page for storing a first page list of data pages storing the second segment of the log, the first page list including a first page reference to the second data page storing the second segment of the log; and updating a fourth data page serving as a restart page, the fourth data page storing a second page list of data pages storing the data directory, and fourth data page being updated to add, to the second page list, a second page reference to the third data page storing the first page list.

In some variations, one or more features disclosed herein including the following features can optionally be included in any feasible combination. In response to the first data page not having reached maximum capacity, a change applied to the data subsequent to the checkpoint can be stored as part of the first segment of the log stored in the first data page.

In some variations, the second page reference can be stored in the fourth data page serving as the restart page prior to releasing a fifth data page previously serving as the restart page. A sixth data page can be allocated for storing a third page list. The third page list can include one or more page references to data pages storing a snapshot of a state machine. The snapshot of the state machine can capture a state of the data at the checkpoint.

In some variations, in response to a crash at the computing node, the data stored at the computing node can be restored based on the data directory. The restoration of the data can include applying, to the snapshot of the state machine, the one or more changes recorded in the log.

In some variations, the restoration of the data can include: identifying, based at least on the second page reference included in the second page list stored in the fourth data page, the third data page storing the second portion of the first page list; identifying, based at least on the first page reference included in the first page list, the second data page storing the second segment of the log; and identifying, based at least on a fourth page reference included in the third page list, a seventh data page storing the snapshot.

In some variations, the fourth data page can be selected as the restart page instead of the fifth data page based at least on a restart index associated with the fourth data page being greater than a restart index associated with the fifth data page. In response to the fourth data page being selected as the restart page, a reference count of the data pages included in the second page list stored in the fourth data page can be incremented.

In some variations, in response to a creation of another snapshot of the data stored at the computing node, a fourth page list of data pages can be stored in the fifth data page. The fourth page list can store another version of the data directory corresponding to the other snapshot.

In some variations, the first data page can be allocated in response to a change being applied to the data. The change can be stored as part of the first segment of the log.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 depicts a flowchart illustrating a process for generating a data directory consistent with implementations of the current subject matter;

When practical, similar reference numbers denote similar structures, features, or elements.

DETAILED DESCRIPTION

Figure 1:
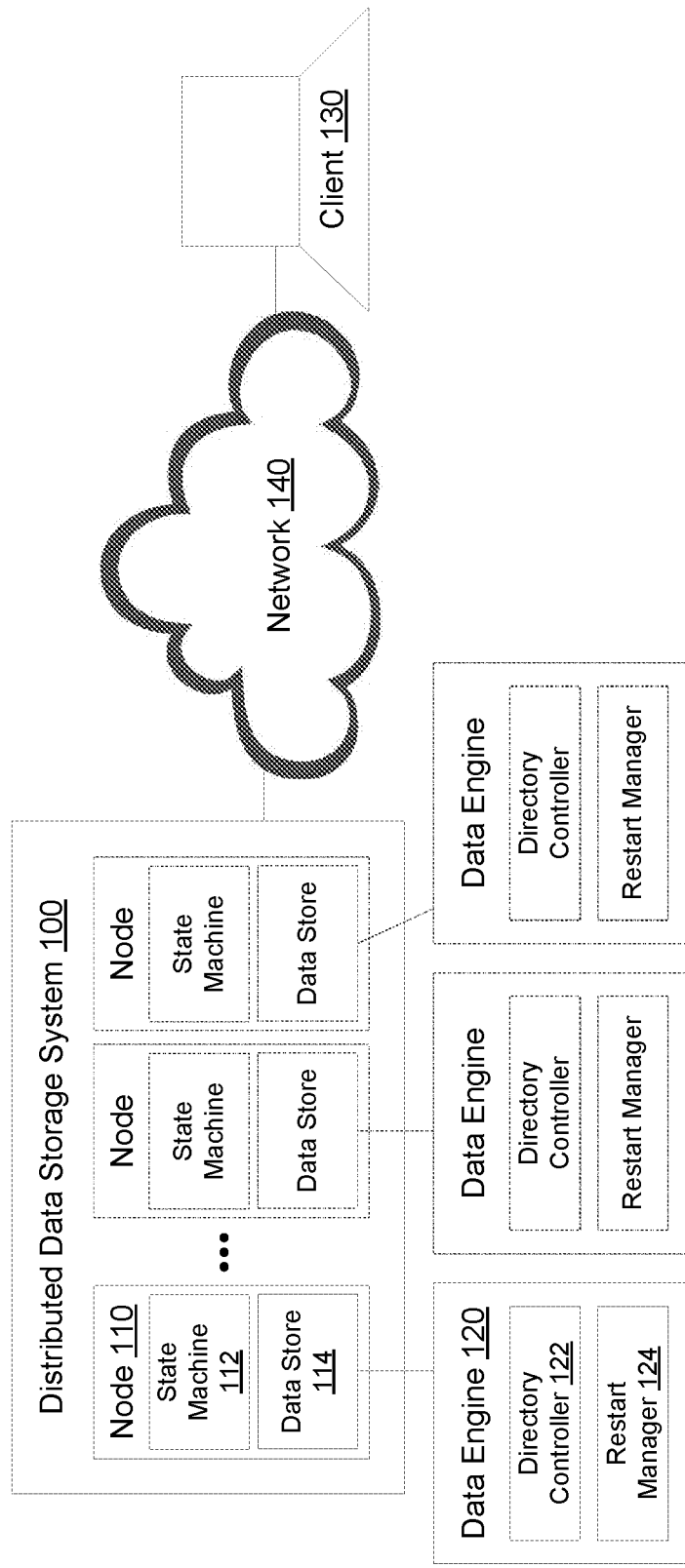
FIG. 1 depicts a system diagram illustrating a distributed data storage system consistent with some implementations of the current subject matter.

A distributed data storage system can include a plurality of computing nodes, each of which storing data in fixed and/or variable sized blocks of memory such as, for example, data pages and/or the like. Each computing node in the distributed data storage system can be associated with a state machine configured to track changes to the data stored at the computing node. For instance, applying changes to the data stored at a computing node can trigger one or more state transitions at the state machine associated with the computing node. Snapshots of the state machine can be created at various checkpoints in order to capture the state of the data stored at the computing node at each checkpoint. Furthermore, the changes applied to the data subsequent to a checkpoint can be recorded in a log such as, for example, a write ahead log and/or the like. In the event of a crash at the computing node, the data at the computing node can be restored to a state prior to the crash by at least applying the changes in the log to a snapshot of the state machine created prior to the crash.

In some implementations of the current subject matter, both snapshots of the state machine created at various checkpoints and the corresponding logs of changes applied to the data at the computing node can be stored in a same data store at the computing node instead of separate data stores. For example, both a snapshot of the state machine at a checkpoint and a log of changes applied to the data at the computing node subsequent to the checkpoint can be stored in one or more fixed size and/or variable size data pages at the computing node. Furthermore, both the log and the snapshot of the state machine can be associated with a data directory including one or more page lists, each of which being an ordered collection of direct page references and/or indirect page references to one or more data pages at the computing node. For instance, the data directory can include a first page list referencing data pages at the computing node storing the snapshot of the state machine and a second page list referencing data pages at the computing node storing the corresponding log. In the event of a crash at the computing node, the log and the snapshot of the state machine can be retrieved, based on the data directory, from the data pages storing the log and the snapshot of the state machine. As noted, the data at the computing node can be restored to a state prior to the crash by at least applying the changes recorded in the log to the snapshot of the state machine.

In some implementations of the current subject matter, the data directory can include a plurality of data pages for storing the first page list referencing the data pages storing the snapshot of the state machine and the second page list referencing the data pages storing the corresponding log. The snapshot of the state machine can be stored in a fixed quantity of data pages. As such, the first page list can also be stored in a fixed quantity of data pages because the size of the second page list referencing the data pages storing the snapshot of the state machine remains static. By contrast, additional data pages can be allocated for storing the log as new changes applied to the data at the computing node are recorded to the log. Thus, more data pages can also be allocated for storing the second page list, as the second page list expands to accommodate page references to the additional data pages being allocated for storing the growing log. Here, each data page can store a segment of the second page list. Meanwhile, a restart page can be used to anchor the data directory by at least providing a page reference to the data page storing an end portion of the second page list. This end portion of the second page list can reference data pages storing the latest segment of the log, which can include the most recent changes applied to the data at the computing node. Restoring the data at the computing node can include applying, to the snapshot of the state machine, all of the changes recorded in the log up until this latest segment of the log.

FIG. 1 depicts a system diagram illustrating a distributed data storage system 100 consistent with implementations of the current subject matter. Referring to FIG. 1, the distributed data storage system 100 can include a plurality of computing nodes, each of which including a data store. Furthermore, each of the plurality of computing nodes can be associated with a state machine configured to track, via state transitions, one or more changes to the data in the corresponding data store. For example, the distributed data storage system 100 can include a computing node 110 that includes at least one data store such as, for example, a data store 114. Although FIG. 1 shows the computing node 110 as including a single data store (e.g., the data store 114), the computing node 110 can include multiple data stores, each of which corresponding to a data partition held at the computing node 110. Furthermore, the computing node 110 can be associated with one or more state machines configured to track, via state transitions, one or more changes to the data in each data partition at the computing node 110. For example, as shown in FIG. 1, the computing node 110 can include a state machine 112, which can be configured to track, via state transitions, one or more changes to the data partition held in the data store 114.

As shown in FIG. 1, the distributed data storage system 100 can be communicatively coupled, via a network 140, with one or more clients including, for example, a client 130. The network 140 can be any wired and/or wireless network including, for example, a public land mobile network (PLMN), a local area network (LAN), a virtual local area network (VLAN), a wide area network (WAN), the Internet, and/or the like. Meanwhile, the client 130 can be any processor-based device including, for example, a mobile device, a wearable device, a tablet computer, a desktop computer, a laptop computer, and/or the like. It should be appreciated that the changes to the data stored at the computing node 110, for example, in the data store 114, can be triggered by one or more queries from the client 130. For instance, the client 130 can send, via the network 140, one or more queries to the distributed data storage system 100 that adds, removes, and/or updates data from data store 114 at the computing node 110. These changes to the data in the data store 114 can trigger one or more state transitions at the state machine 112.

In some implementations of the current subject matter, the data store 114 can be a key-value store configured to store data in the form of one or more key-value pairs (KVPs). For instance, the data store 114 can be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

Referring again to FIG. 1, each data store in the distributed data storage system 100, for example, the data store 114 at the computing node 110, can be coupled with data engine such as, for example, a data engine 120. In some implementations of the current subject matter, the data engine 120 can be configured to handle data associated with the state machine 112, which is configured to track changes to the data partition held in the data store 114. This data included in this data partition can include one or more snapshots of the state machine 112 representative of a state of the computing node 110, for example, the data in the data store 114, at various checkpoints. Furthermore, these snapshots of the state machine 112 can be stored at in the data store 114, for example, in one or more fixed size and/or variable size data pages.

According to some implementations of the current subject matter, the data engine 120 can include a directory controller 122 and a restart manager 124. The directory controller 122 can be configured to generate a data directory. Meanwhile, the restart manager 124 can be configured to perform crash recovery at the computing node 110. For example, in the event of a crash at the computing node 110, the restart manager 124 can restore, based at least on the data directory generated by the directory controller 122, the data in the data store 114 to a state prior to the crash at the computing node.

The data directory can include a first page list that includes direct page references and/or indirect page references to one or more data pages in the data store 114 storing a snapshot of the state machine 112 created at a checkpoint. Alternatively and/or additionally, the data directory can include a second page list that includes direct page references and/or indirect page references to one or more data pages in the data store 114 storing a log of changes applied to the data at the data store 114 subsequent to the checkpoint. It should be appreciated that the data directory can also be stored in one or more data pages in the data store 114.

As noted, the first page list can be stored in a fixed quantity of data pages because the snapshot of the state machine being stored in a fixed quantity of data pages can keep the size of the first page list static. However, additional data page can be allocated for storing the second page list because the log can expand to record new changes applied to the data at the data store 114, thereby necessitating the allocation of more data pages for storing the log. It should be appreciated that each data page can hold a segment of the second page list. Thus, the data directory can include a restart page, which can include a page reference to a data page storing an end portion of second page list. The end portion of the second page list can reference data pages storing the latest segment of the log, which can include the most recent changes applied to the data at the data store 114.

In some implementations of the current subject matter, the data store 114 can include multiple restart pages. For example, certain data pages in the data store 114, for example, the first two data pages, can be reserved to serve as restart pages. A first restart page can reference a first data page storing an end portion of the second page list referencing data pages storing the latest segment of the log. As noted, the latest segment of the log can include the most recent changes that are applied to the data in the data store 114. If the computing node 110 crashes at this time, data in the data store 114 can be restored by at least applying, to the snapshot of the state machine 112, all of the changes recorded in the log up until that latest segment of the log, which can be stored in data pages referenced by the end portion of second page list held in the first data page. Here, the first data page can be located based at least on the page reference included in the first restart page.

However, once the first data page reaches maximum capacity, the directory controller 122 can switch from the first restart page to a second restart page that references a second data page. In some implementations of the current subject matter, restart pages can be used in a round-robin fashion. For example, while the data directory for a first snapshot of the state machine 112 can be anchored using the first restart page and the data directory for a second snapshot of the state machine 112 can be anchored using the second restart page, the data directory for a third snapshot of the state machine 112 can be anchored using the first restart page. The more recent restart page, for example, the restart page containing a larger portion of the page list for the data directory 200, can be used during a crash recovery at the computing node 110.

In some implementations of the current subject matter, direct page references and/or indirect page references being added to the second page list can now be stored in the second data page instead of the first data page referenced by the first restart page. If a crash at the computing node 110 occurs at this time, the second data page can be identified based on the second restart page and the data pages holding the latest segment of the log can be identified based on the end portion of the second page list stored in the second data page. Data in the data store 114 can be restored to a state prior to the crash by at least applying, to the snapshot of the state machine 112, all of the changes recorded in the log up until the latest segment of the log stored in data pages referenced by the end portion of the second page list, which is now held in the second data page.

Figure 2A:
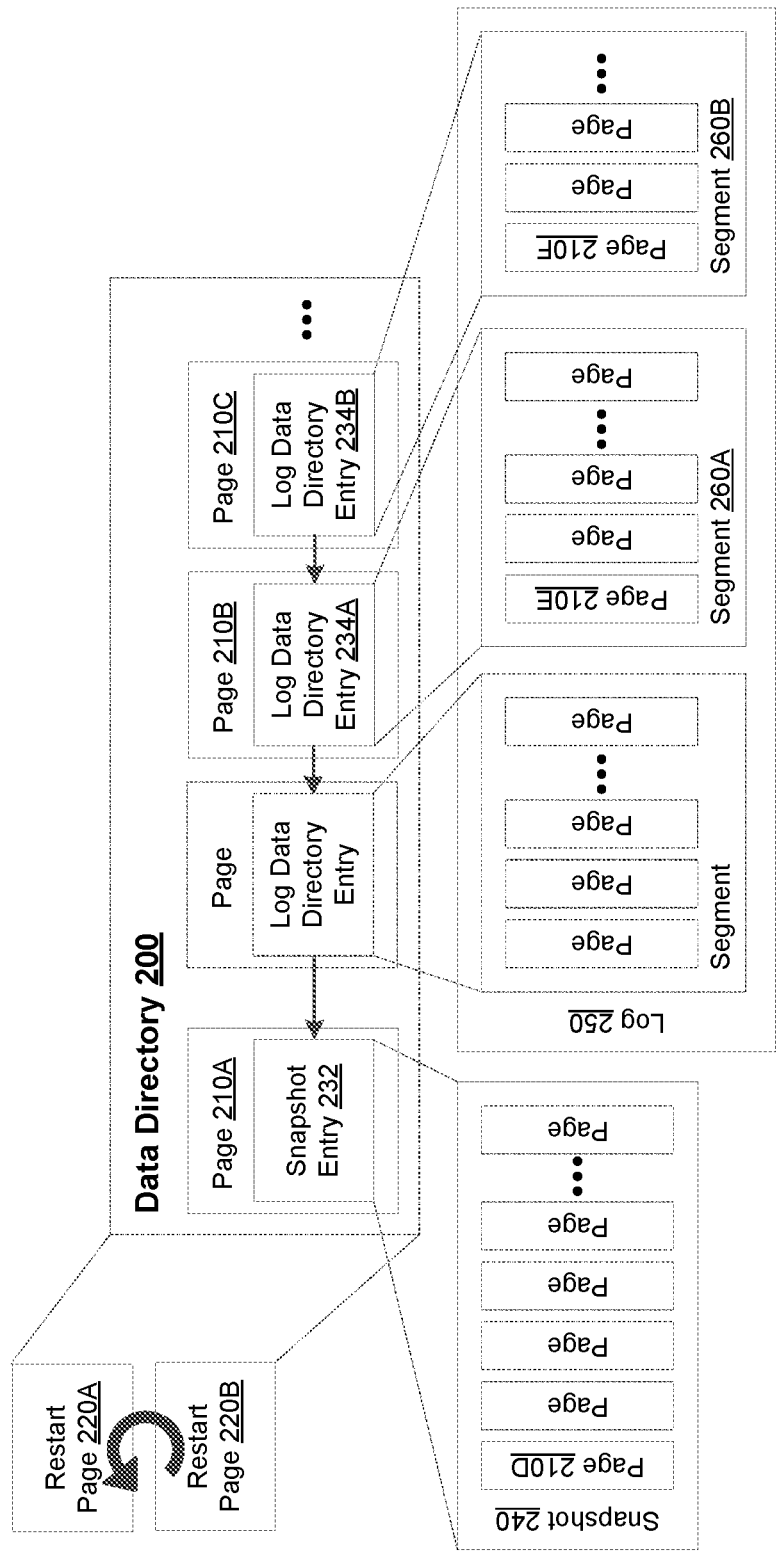
FIG. 2A depicts a data directory consistent with implementations of the current subject matter.

To further illustrate, FIG. 2A depicts a data directory 200 consistent with some implementations of the current subject matter. Referring to FIG. 2A, the data directory 200 can include a plurality of data pages including, for example, a first page 210A, a second page 210B, and/or a third page 210C. The first page 210A can include can include a snapshot entry 232, which can include a page list of the data pages storing the snapshot 240 including, for example, a fourth page 210D. As noted, the snapshot 240 can be created at a checkpoint and can capture a state of the state machine 112, for example, the data stored in the data store 114, at the checkpoint. It should be appreciated that the snapshot entry 232 can include one or more direct page references and/or indirect page references to the data pages storing the snapshot 240. A direct page reference can refer to a reference to a data page storing at least a portion of the snapshot 240. Meanwhile, an indirect page reference can refer a reference to a data page storing a page list that includes additional direct page references and/or indirect page references to data pages storing the snapshot 240.

Referring again to FIG. 2A, the second page 210B and/or the third page 210C can each include a log data directory entry, which can include a page list of the data pages storing a segment of a log 250. For instance, the second page 210B can include a first log data directory entry 234A, which can include a page list of the data pages storing a first segment 260A of the log 250 including, for example, a fifth page 210E. Alternatively and/or additionally, the third page 210C can include a second log data directory entry 234B, which can include a page list of the data pages storing a second segment 260B of the log 250 including, for example, a sixth page 210F. It should be appreciated that the first log data directory entry 234A and/or the second log data directory entry 234B can each include one or more direct page references and/or indirect page references to data pages in the data store 114 storing segments of the log 250 including, for example, the fifth page 240E and the sixth page 240F. Moreover, the third page 210C can also include a reference to the second page 210B.

As noted, the log 250 can record changes applied to the data in the data store 114 subsequent to the creation of the snapshot 240 at the checkpoint. Moreover, as used herein, a first page reference in the log segment's page list can refer to a reference to a data page storing at least a portion of the log 250 whereas subsequent page references in the log segment's page list can refer to a reference to the data pages storing a page list which is a concatenation of optional page lists with surplus data of individual log entries in this log segment.

In some implementations of the current subject matter, the size of the snapshot entry 232 can be fixed due to the quantity of data pages (e.g., the fourth page 210D) storing the snapshot 240 being fixed. By contrast, the quantity of data pages storing the log 250 can increase as changes are applied to the data stored in the data store 114. As such, additional data pages can be allocated to accommodate additional log data directory entries (e.g., the first log data directory entry 234A, the second log data directory entry 234B, and/or the like), which can be generated as new changes recorded to the log 250 that caused the current log segment page to overflow. For example, the log 250 can grow in order to record new changes applied to the data stored in the data store 114, for example, subsequent to the creation of the snapshot 240 at the checkpoint. These new changes can be stored in the first log segment 260A. When the first log segment 260A is full, a second log segment 260B can be created, thereby necessitating the addition of new page with a log data directory entry such as, for example, the first log data directory entry 234A, the second log data directory entry 234B, and/or the like.

In some implementations of the current subject matter, the data directory 200 can include a first restart page 220A and a second restart page 220B, which can be used in a round-robin fashion to store a page list of the data pages storing the data directory 200. In doing so, the first restart page 220A and/or the second restart page 220B can anchor the data directory 200. For example, the first restart page 220A and/or the second restart page 220B can each include a header, which can contain a restart index and a page list for the data directory 200. The restart index for each of the first restart page 220A and/or the second restart page 220B can be a counter that is incremented each time a new version of the restart page is generated. The page list for the data directory 200 can include the individual entries that are part of the data directory 200 including, for example, the snapshot entry 232, the first log data directory entry 234A, the second log data directory entry 234B, and/or the like. The directory controller 122 can switch between the first restart page 220A and the second restart page 220B when new snapshots of the state machine 112 are created and/or when new log segments are created, such as the second log segment 260B. For instance, the first restart page 220A can be used to store a page list of the data directory 200 corresponding to a snapshot of the state machine 112 whereas the second restart page 220B can be used to store another page list of another version of data directory 200 corresponding to a subsequent snapshot of the state machine 112. Alternatively and/or additionally, the first restart page 220A can be used to store a page list of the data directory 200 corresponding to a snapshot of the state machine 112 with log segments up to the first log segment 260A whereas the second restart page 220B can be used to store another page list of another version of data directory 200 corresponding to the same snapshot of the state machine 112, but with additional segments of the log 250 including, for example, the second log segment 260B. During crash recovery at the computing node 110, the restart manager 124 can identify, between the first restart page 220A and the second restart page 220B, a more recent restart page based at least on restart index stored in the restart page. The more recent restart page may include a larger restart index and so it can be identified as the more recent restart page.

It should be appreciated that the directory controller 122 can observe one or more input/output (I/O) barriers when switching between the first restart page 220A and the second restart page 220B. For example, after the third page 210C is created, the directory controller 122 can still be required to complete all input/output operations on the log segment referenced by second page 210B (e.g., the page referenced by the second restart page 220B). This can occur upon creation of a new log data directory entry such as, for example, the first log data directory entry 234A, the second log data directory entry 234B, and/or the like. Furthermore, the directory controller 122 can release the second restart page 220B only after the directory controller 122 has successfully written the first restart page 220A to include the page reference to the third page 210C.

In some implementations of the current subject matter, the observation of input/output (I/O) barriers can prevent the use of a restart page (e.g., the first restart page 220A and/or the second restart page 220B) pointing to not yet written data pages. Two types of input/output (I/O) barriers can be observed. First, writes to a restart page (e.g., the first restart 220A and/or the second restart page 220B) to switch to a new version of the data directory 200 can only happen after the writing of a data page containing a log data directory entry (e.g., the second page 210B and/or a third page 210C) is complete. Otherwise, the restart page can store a direct page reference and/or an indirect page reference to not yet written page, which can disrupt a subsequent crash recovery at the computing node 110.

Alternatively and/or additionally, a second input/output (I/O) barrier can include confirming writes to the new log segment only after the writing of the log data directory entry corresponding to the new log segment and new restart page is confirmed. This second input/output (I/O) barrier can be required to prevent confirmation of the commitment of an operation to the client 130, which can be lost on a restart of the computing node 110, because the version of the data directory 200 for the new log segment has not yet been persisted whereas the corresponding log data directory entry has already been persisted.

The restart manager 124 can be configured to restore the data stored at the computing node 110, for example, in the data store 114, in the event of a crash at the computing node 110. In some implementations of the current subject matter, the restart manager 124 can perform the crash recovery based at least on the data directory 200. For example, the restart manager 124 can retrieve, based at least on the first page 210A included in the data directory 200, the snapshot 240 of the state machine 112, which can be created at a checkpoint prior to the crash at the computing node 110. The restart manager 124 can also retrieve, based at least on the second page 210B included in the data directory 200, the log 250, which can include changes applied to the data in the data store 114 subsequent to the checkpoint. As noted, retrieving the second page 210B can include identifying, based at least on the first restart page 220A, the third page 210C as containing the end portion of the log 250. Meanwhile, the restart manager 124 can select the first restart page 220A instead of the second restart page 220B based at least on the respective restart index of the first restart page 220A and the second restart page 220B.

According to some implementations of the current subject matter, the restart manager 124 can restore the data in the data store 114 by at least applying, to the snapshot 240, the changes recorded in the log 250 up until the second segment 260B, which can be the latest segment in the log 250 containing the most recent changes applied to the data in the data store 114. The data pages storing the second segment 260B of the log 250 can be identified based on the second log data directory entry 210C included in the third page 210C.

Figure 2B:
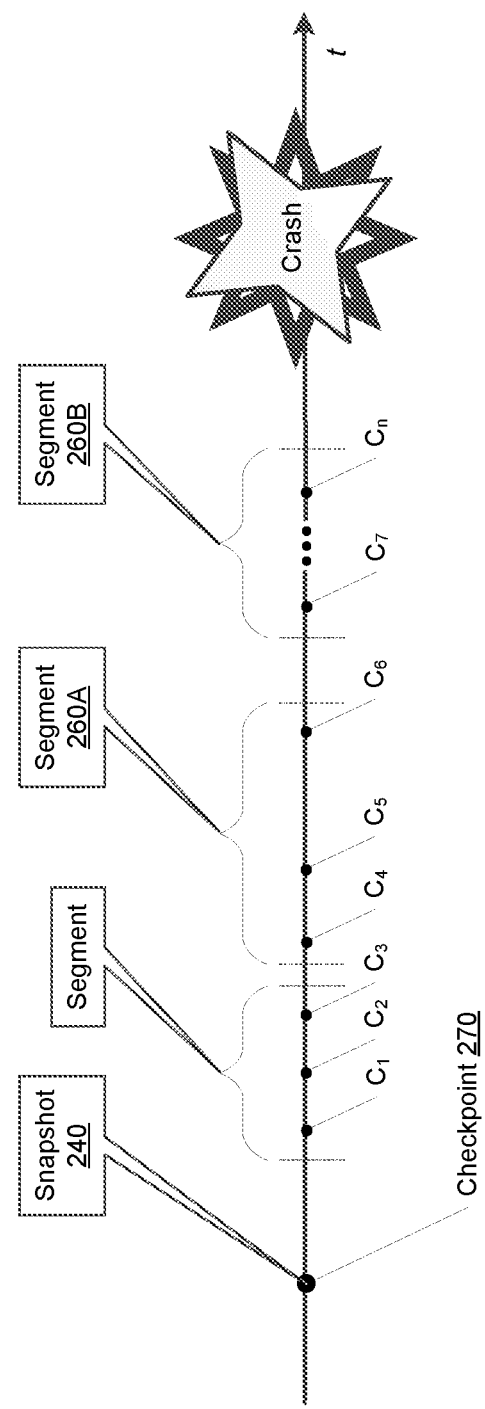
FIG. 2B depicts a crash recovery at a computing node within a distributed data storage system consistent with some implementations of the current subject matter.

To further illustrate, FIG. 2B depicts a crash recovery at the computing node 110 within the distributed data storage system 100 consistent with some implementations of the current subject matter. Referring to FIGS. 2A-B, the snapshot 240 of the state machine 112 can be created at a checkpoint 270. Meanwhile, an n quantity of changes (e.g., $C_1, C_2, \ldots, C_n$) can be applied to the data at the computing node 110, for example, in the data store 114, subsequent to the checkpoint. This n quantity of changes can be recorded in various segments of the log 250. As noted, the second page 210B can store the first log data directory entry 234A, which can include a page list of the data pages storing the first segment 260A of the log 250 including, for example, the fifth page 210E. Alternatively and/or additionally, the third page 210C can include the second log data directory entry 234B, which can include a page list of the data pages storing the second segment 260B of the log 250 including, for example, the sixth page 210F.

As shown in FIGS. 2A-B, the first segment 260A of the log 250 can include changes $C_4$, $C_5$, and $C_6$ while the second segment 260B of the log 250 can include the most recent changes applied to the data in the data store 114 including, for example, changes $C_7$ through $C_n$. In the event of a crash at the computing node 110, the data in the data store 114 can be restored by at least applying, to the snapshot 240, the n quantity of changes (e.g., $C_1, C_2, \ldots, C_n$) recorded in the log 250. For example, in some implementations of the current subject matter, restoring the data in the data store 114 can include retrieving, based at least on the data directory 200, the data pages storing the snapshot 240 and the log 250. Notably, the data pages holding the latest segment of the log 250 (e.g., the sixth page 210F and/or the like), which can include the most recent changes applied to the data in the data store 114 prior to the crash (e.g., changes $C_7$ through $C_a$), can be identified based on the second log data directory entry 234B in the second page 210B. The page reference to the second page 210C can be stored as part of the page list included in the first restart page 220A.

In some implementations of the current subject matter, restoring the data in the data store 114 can require a plurality of data pages from the data store 114. For example, to perform crash recovery at the computing node 110, the restart manager 124 can require data from the data pages storing the data directory 200, the snapshot 240, and the log 250, which can include, for example, the first page 210A, the second page 210B, the third page 210C, the fourth page 210D, the fifth page 210E, and/or the sixth page 210F. In order to prevent these data pages from being overwritten during crash recovery, the restart manager 124 can increment the corresponding reference count of these data pages, for example, when loading a corresponding restart page storing direct page references and/or indirect page references to these data pages. For instance, upon identifying the first restart page 220A as the most recent restart page, the restart manager 124 can increment the reference count associated with each of the first page 210A, the second page 210B, the third page 210C, the fourth page 210D, the fifth page 210E, and/or the sixth page 210F, which can be referenced by the page list included in the first restart page 220A. In doing so, the restart manager 124 can prevent these data pages from being overwritten during crash recovery. It should be appreciated the reference count associated with the data pages referenced by the first restart page 220A can be decremented once another restart page (e.g., the second restart page 220B) has been successfully written.

In some implementations of the current subject matter, the directory controller 122 can create multiple snapshots of the state machine 112, for example, at successive checkpoints. Accordingly, the directory controller 122 can observe one or more input/output (I/O) barriers when creating successive snapshots of the state machine 112. For example, the directory controller 122 can be required to complete all input/output operations for a previous snapshot, including generate a corresponding data directory for that snapshot, before the directory controller 122 can start writing a restart page for the data directory associated with a next snapshot. Furthermore, the directory controller 122 can release the data directory associated with the previous snapshot only after the directory controller 122 has written the restart page for the data directory associated with the next snapshot.

FIG. 3 depicts a flowchart illustrating a process 300 for generating a data directory consistent with implementations of the current subject matter. Referring to FIGS. 1, 2A-B, and 3, the process 300 can be performed by the data engine 120, for example, by the directory controller 122. For example, the data engine 120 can perform the process 300 to generate the data directory 200. As noted, the data directory 200 can include the first page 210A, which can store the first snapshot entry 232 including a page list of the data pages (e.g., the fourth page 210D) in the data store 114 storing the snapshot 240 of the state machine 112 created at the checkpoint 270. The data directory 200 can also include the second page 210B and/or the third page 210C. The second page 210B can store the first log data directory entry 234A, which can include a page list of the data pages in the data store 114 storing the first segment 260A of the log 250. Meanwhile, the third page 210C can store the second log data directory entry 234B, which can include a page list of the data pages in the data store 114 storing the second segment 260B of the log 250. As noted, the log 250 can record changes applied to the data in the data store 114 subsequent to the checkpoint 270.

The data engine 120 can allocate a first data page for storing a first page list including one or more page references to data pages storing a snapshot of the state machine 112 capturing a state of the data in the data store 114 of the computing node 110 at a checkpoint (302). For example, as shown in FIGS. 2A-B, the directory controller 122 at the data engine 120 can allocate the first page 210A, which can store the snapshot entry 232. The snapshot entry 232 can be a page list of the data pages in the data store 114 storing the snapshot of the state machine 112. As such, the snapshot entry 232 can include one or more direct page references and/or indirect page references to data pages storing the snapshot 240, such as, for example, the fourth page 210D. As noted, the snapshot 240 can be created at the checkpoint 270 and can capture a state of the data in the data store 114 of the computing node 110 at the checkpoint 270.

The data engine 120 can store, in a second data page, a first segment of a log recording one or more changes applied to the data in the data store 114 subsequent to the checkpoint (304). For example, as shown in FIG. 2A, the fifth page 210E can store the first segment 260A of the log 250, which records one or more changes applied to the data in the data store 114 subsequent to the checkpoint.

The data engine 120 can determine whether the second data page storing the first segment of the log has reached maximum capacity (305). For example, referring to FIGS. 2A-B, the data engine 120, for example, the directory controller 122, can determine whether the fifth page 210E, which stores the first segment 260A of the log 250, has sufficient capacity to accommodate an additional change applied to the data in the data store 114 subsequent to the checkpoint. As shown in FIG. 2A, the fifth page 210E can be referenced by the first log data directory entry 234A stored in the second page 210B. The first log data directory entry 234A can include a page list of the data pages storing the first segment 260A of the log 250.

If the data engine 120 determines that the second data page storing the first segment of the log has not reached maximum capacity (305-N), the data engine 120 can store, in the second data page, a change applied to the data in the data store 114 subsequent to the checkpoint (306). For example, if the directory controller 122 at the data engine 120 determines that the fifth page 210E has not reached maximum capacity, the additional change applied to the data in the data store 114 subsequent to the checkpoint can be stored in the fifth page 210E.

Alternatively and/or additionally, the data engine 120 can determine that the second data page storing the first segment of the log has reached maximum capacity (305-Y). For instance, the directory controller 122 at the data engine 120 can determine that the fifth page 210E has reached maximum capacity and cannot accommodate the additional change applied to the data in the data store 114 subsequent to the checkpoint. As such, the data engine 120 can allocate a third data page for storing, as part of a second segment of the log, a change applied to the data in the data store 114 subsequent to the checkpoint (308). Furthermore, the data engine 120 can allocate a fourth data page for storing a second page list of the data pages storing the second segment of the log (310).

For instance, the directory controller 122 at the data engine 120 can allocate the sixth page 210F for storing the second segment 260B of the log 250. The additional change applied to the data in the data store 114, which cannot be stored as part of the first segment 260A, can be stored as part of the second segment 260B. Furthermore, the directory controller 122 at the data engine 120 can allocate the third page 210C for storing the second log data directory entry 234B, which can include a page list of the data pages storing the second segment 260B of the log 250. Accordingly, the second log data directory entry 234B can include a reference to the sixth page 210F, which holds the second segment 260B of the log 250.

The data engine 120 can update a fifth data page serving as a restart page to include a second page reference to the fourth data page (312). According to some implementations of the current subject matter, the directory controller 122 can update the restart page used to anchor the data directory 200, upon allocating the third page 210C for storing the page reference to the sixth page 210F. As noted, the restart page can anchor the data directory 200 by at least storing a page reference to each data page storing the data directory 200. Furthermore, the first restart page 220A and/or the second restart page 220B can be used in a round-robin fashion as successive snapshots of the state machine 112 are created and stored in the data store 114.

Figure 4:
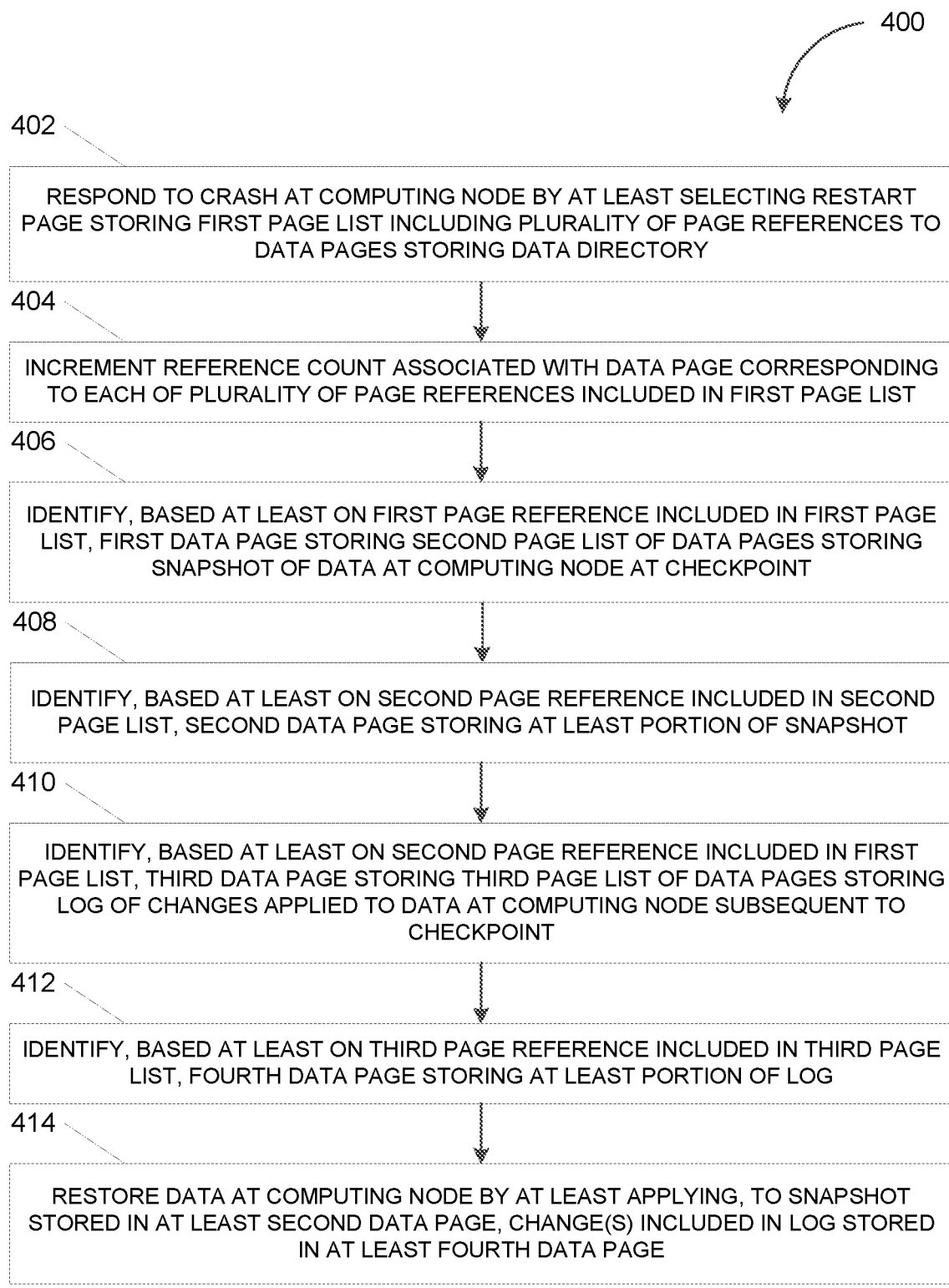
FIG. 4 depicts a flowchart illustrating a process for performing a crash recovery at a computing node within a distributed data storage system consistent with some implementations of the current subject matter.

FIG. 4 depicts a flowchart illustrating a process 400 for performing a crash recovery at a computing node within a distributed data storage system consistent with some implementations of the current subject matter. Referring to FIGS. 1, 2A-B, and 4, the process 400 can be performed by the data engine 120, for example, by the restart manager 124. For example, the data engine 120 can perform the process 400 in order to restore the data at the computing node 110, for example, in the data store 114 to a state before a crash at the computing node 110.

The data engine 120 can respond to a crash at the computing node 110 by at least selecting a restart page storing a first page list including a plurality of page references to data pages storing the data directory 200 (402). As shown in FIG. 2A, in some implementations of the current subject matter, the restart manager 124 at the data engine 120 can respond to a crash at the computing node 110 by at least selecting first restart page 220A or the second restart page 220B, each of which storing a page list of the data pages in the data store 114 storing the data directory 200. The restart manager 124 can select the more recent of the first restart page 220A and the second restart page 220B based at least on which restart page contains a higher restart index. As such, the restart manager 124 can select the first restart page 220A instead of the second restart page 220B based at least on the first restart page 220A having a higher restart index than the second restart page 220B.

The data engine 120 can increment a reference count associated with the data pages corresponding to each of the plurality of page references included in the first page list (404). In some implementations of the current subject matter, the data engine 120, for example, the restart manager 124, can increment the reference count of the data pages referenced by the first restart page 220A, for example, when the first restart page 220A is selected instead of the second restart page 220B as being the most recent restart page. For instance, upon identifying the first restart page 220A as the most recent restart page, the restart manager 124 can increment the reference count associated with the first page 210A, the second page 210B, and/or the third page 210C. Each of these data pages can be part of the page list included in the first restart page 220A. By incrementing the reference count, the restart manager 124 can prevent these data pages from being overwritten during crash recovery. Similarly, for each snapshot entry (e.g., the snapshot entry 232) and log data directory entry (e.g., the first log data directory entry 234A, the second log data directory entry 234B, and/or the like), the reference counts of the data pages referenced by the page lists that are part of each entry are also incremented to prevent these data pages from being overwritten during crash recovery.

The data engine 120 can identify, based at least on a first page reference included in the first page list, a first data page storing a second page list of data pages storing checkpoint snapshot of data at the computing node 110 at a checkpoint (406). For instance, as shown in FIG. 2A, the first restart page 220A can include a page reference to the first page 210A. The first page 210A can store the snapshot entry 232, which includes a page list of the data pages (e.g., the fourth page 210D and/or the like) storing the snapshot 112 of the data stored in the data store 114, for example, at the checkpoint 270.

The data engine 120 can identify, based at least on a second page reference included in the second page list, a second data page storing at least a portion of the snapshot (408). As noted, the snapshot entry 232 stored in the first page 210A can include a page list of the data pages in the data store 114 (e.g., the fourth page 210D and/or the like) storing the snapshot 112 of the data stored in the data store 114. Accordingly, the data engine 120, for example, the restart manager 124, can identify the fourth page 210D storing at least a portion of the snapshot 112 based at least on a page reference to the fourth page 210D, which can be part of the page list included in the snapshot entry 232 stored in the first page 210A.

The data engine 120 can identify, based at least on a second page reference included in the first page list, a third page list of data pages storing at least a portion of a log of changes applied to the data stored at the computing node 110 subsequent to the checkpoint (410). As noted, the first restart page 220A can include a page reference to the second page 210B and/or the third page 210C, each of which storing a log data directory entry that includes a page list of the data pages in the data store 114 storing at least a portion of the log 250. Thus, in some implementations of the current subject matter, the restart manager 124 at the data engine 120 can, for example, identify, based at least on the page references included in the first restart page 220A, the second page 210B and/or the third page 210C. The second page 210B can store the first log data directory entry 234A, which can include direct page reference and/or indirect page references to data pages (e.g., the fifth page 210E and/or the like) storing the first segment 260A of the log 250. Alternatively and/or additionally, the third page 210C can include the second log data directory entry 234B, which can include direct page references and/or indirect page references to data pages (e.g., the sixth page 210F and/or the like) storing the second segment 260B of the log 250. The log 250 can record one or more changes that are applied to the data in the data store 114 subsequent to the checkpoint 270.

The data engine 120 can identify, based at least on a third page reference included in the third page list, a fourth data page storing at least a portion of the log (412). For instance, the data engine 120, for example, the restart manager 124, can identify, based at least on the page list included in the first log data directory entry 234A, the fifth page 210E storing at least a portion of the first segment 260A of the log 250. Alternatively and/or additionally, the restart manager 124 at the data engine 120 can identify, based at least on the page list included in the second log data directory entry 234B, the sixth page 210F storing at least a portion of the second segment 260B of the log 250.

The data engine 120 can restore the data at the computing node 110 by at least applying, to the snapshot stored in at least the second data page, the one or more changes included in the log stored in at least the fourth data page (414). For example, in order to restore the data in the data store 114 to a state prior to the crash at the computing node 110, the restart manager 124 at the data engine 120 can apply, to the snapshot 240 stored in at least the fourth page 210D, the changes included in the log 250 stored in at least the fifth page 210E and/or the sixth page 210F.

Figure 5:
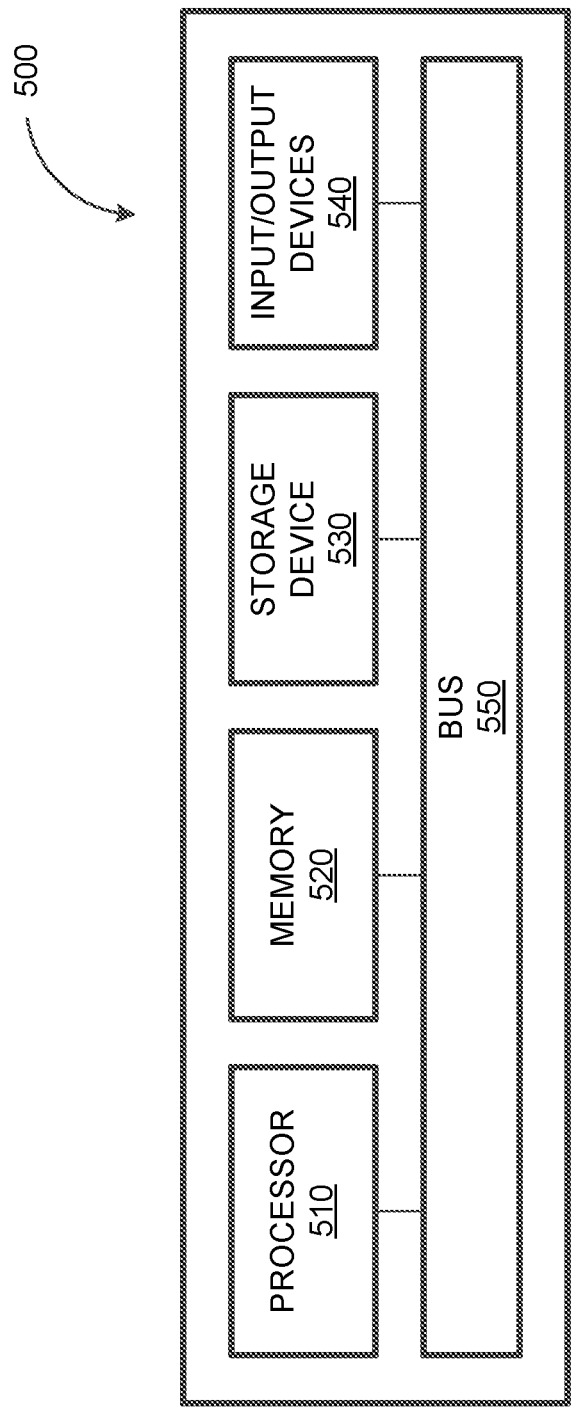
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100, for example, the data engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
  at least one data processor; and
  at least one memory storing instructions which, when executed by the at least one data processor, cause operations comprising:
    generating a data directory for a computing node comprising the distributed data storage system by at least allocating a first data page for storing a first segment of a log, the log recording one or more changes applied to data subsequent to a checkpoint, the data being stored at the computing node comprising the distributed data storage system;

in response to the first data page having reached maximum capacity:

allocating a second data page for storing a second segment of the log; and allocating a third data page for storing a first page list identifying a first plurality of data pages storing the second segment of the log, the first page list including a first page reference to the second data page storing the second segment of the log; and updating a fourth data page serving as a restart page, the fourth data page storing a second page list identifying a second plurality of data pages storing the data directory, and the fourth data page being updated to add, to the second page list, a second page reference to the third data page storing the first page list.

2. The system of claim 1, further comprising:

in response to the first data page not having reached maximum capacity, storing, as part of the first segment of the log stored in the first data page, a change to applied to the data subsequent to the checkpoint.

3. The system of claim 1, wherein the second page reference is stored in the fourth data page serving as the restart page prior to releasing a fifth data page previously serving as the restart page.

4. The system of claim 3, further comprising:

allocating a sixth data page for storing a third page list identifying a third plurality of data pages storing a snapshot of a state machine, the snapshot of the state machine capturing a state of the data at the checkpoint.

5. The system of claim 4, further comprising:

in response to a crash at the computing node, restoring, based at least on the data directory, the data stored at the computing node, the restoration of the data including applying, to the snapshot of the state machine, the one or more changes recorded in the log.

6. The system of claim 5, wherein the restoration of the data comprises:

identifying, based at least on the second page reference included in the second page list stored in the fourth data page, the third data page storing the first page list;

identifying, based at least on the first page reference included in the first page list, the second data page storing the second segment of the log; and identifying, based at least on a fourth page reference included in the third page list, a seventh data page storing the snapshot.

7. The system of claim 3, wherein the fourth data page is selected as the restart page instead of the fifth data page based at least on a restart index associated with the fourth data page being greater than a restart index associated with the fifth data page.

8. The system of claim 7, further comprising:

in response to the fourth data page being selected as the restart page, incrementing a reference count of the data pages included in the second page list stored in the fourth data page.

9. The system of claim 3, further comprising:

in response to a creation of another snapshot of the data stored at the computing node, storing, in the fifth data page, a fourth page list identifying a fourth plurality of data pages storing another version of the data directory corresponding to the other snapshot.

10. The system of claim 1, wherein the first data page is allocated in response to a change being applied to the data, and wherein the change is stored as part of the first segment of the log.

11. A computer-implemented method, comprising:

generating a data directory for a computing node comprising the distributed data storage system by at least allocating a first data page for storing a first segment of a log, the log recording one or more changes applied to data subsequent to a checkpoint, the data being stored at the computing node comprising the distributed data storage system;

in response to the first data page having reached maximum capacity:

allocating a second data page for storing a second segment of the log; and allocating a third data page for storing a first page list identifying a first plurality of data pages storing the second segment of the log, the first page list including a first page reference to the second data page storing the second segment of the log; and updating a fourth data page serving as a restart page, the fourth data page storing a second page list identifying a second plurality of data pages storing the data directory, and the fourth data page being updated to add, to the second page list, a second page reference to the third data page storing the first page list.

12. The method of claim 11, further comprising:

in response to the first data page not having reached maximum capacity, storing, as part of the first segment of the log stored in the first data page, a change to applied to the data subsequent to the checkpoint.

13. The method of claim 11, wherein the second page reference is stored in the fourth data page serving as the restart page prior to releasing a fifth data page previously serving as the restart page.

14. The method of claim 13, further comprising:

allocating a sixth data page for storing a third page list identifying a third plurality of data pages storing a snapshot of a state machine, the snapshot of the state machine capturing a state of the data at the checkpoint.

15. The method of claim 14, further comprising:

in response to a crash at the computing node, restoring, based at least on the data directory, the data stored at the computing node, the restoration of the data including applying, to the snapshot of the state machine, the one or more changes recorded in the log.

16. The method of claim 15, wherein the restoration of the data comprises:

identifying, based at least on the second page reference included in the second page list stored in the fourth data page, the third data page storing the first page list;

identifying, based at least on the first page reference included in the first page list, the second data page storing the second segment of the log; and identifying, based at least on a fourth page reference included in the third page list, a seventh data page storing the snapshot.

17. The method of claim 13, wherein the fourth data page is selected as the restart page instead of the fifth data page based at least on a restart index associated with the fourth data page being greater than a restart index associated with the fifth data page.

18. The method of claim 17, further comprising:

in response to the fourth data page being selected as the restart page, incrementing a reference count of the data pages included in the second page list stored in the fourth data page.

19. The method of claim 13, further comprising:

in response to a creation of another snapshot of the data stored at the computing node, storing, in the fifth data page, a fourth page list identifying a fourth plurality of data pages another version of the data directory corresponding to the other snapshot.

20. A non-transitory computer-readable medium storing instructions, which when executed by at least one data processor, result in operations comprising:

generating a data directory for a computing node comprising the distributed data storage system by at least allocating a first data page for storing a first segment of a log, the log recording one or more changes applied to data subsequent to a checkpoint, the data being stored at the computing node comprising the distributed data storage system;

in response to the first data page having reached maximum capacity:

allocating a second data page for storing a second segment of the log; and allocating a third data page for storing a first page list identifying a first plurality of data pages storing the second segment of the log, the first page list including a first page reference to the second data page storing the second segment of the log; and updating a fourth data page serving as a restart page, the fourth data page storing a second page list identifying a second plurality of data pages storing the data directory, and the fourth data page being updated to add, to the second page list, a second page reference to the third data page storing the first page list.

* * * * *